(12) United States Patent
Akamine

(10) Patent No.: US 9,986,108 B2
(45) Date of Patent: May 29, 2018

(54) IMAGE PROCESSING SYSTEM, IMAGE FORMING DEVICE, AND IMAGE FORMING METHOD FOR EXCLUSIVE IMAGE PROCESSING

(71) Applicant: FUJI XEROX CO., LTD., Tokyo (JP)

(72) Inventor: Ryo Akamine, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days. days.

(21) Appl. No.: 14/803,341

(22) Filed: Jul. 20, 2015

(65) Prior Publication Data
US 2016/0286053 A1 Sep. 29, 2016

(30) Foreign Application Priority Data

Mar. 24, 2015 (JP) .................... 2015-061514

(51) Int. Cl.
*H04N 1/00* (2006.01)
(52) U.S. Cl.
CPC ....... *H04N 1/0023* (2013.01); *H04N 1/00108* (2013.01); *H04N 1/00233* (2013.01); *H04N 1/00307* (2013.01); *H04N 1/00315* (2013.01); *H04N 2201/006* (2013.01); *H04N 2201/0055* (2013.01); *H04N 2201/0081* (2013.01); *H04N 2201/0082* (2013.01); *H04N 2201/0096* (2013.01)
(58) Field of Classification Search
CPC ............ H04N 1/0023; H04N 1/00108; H04N 1/00233; H04N 1/00307; H04N 1/00315; H04N 2201/006; H04N 2201/0081; H04N 2201/0082; H04N 2201/0096; H04N 2201/0055; G06F 3/1292

USPC ............................................... 358/1.14, 1.15
See application file for complete search history.

(56) References Cited

U.S. PATENT DOCUMENTS

| 2007/0086049 A1* | 4/2007 | Lee ........................ G06F 21/445 358/1.15 |
| 2009/0031406 A1* | 1/2009 | Hirose ................ H04L 63/1441 726/7 |
| 2013/0070297 A1* | 3/2013 | Kato .................... H04N 1/0023 358/1.15 |
| 2014/0240775 A1* | 8/2014 | Suzuki ............... H04N 1/00307 358/1.15 |

(Continued)

FOREIGN PATENT DOCUMENTS

JP 2012-183215 A 9/2012

*Primary Examiner* — Benny Q Tieu
*Assistant Examiner* — Juan M Guillermety
(74) *Attorney, Agent, or Firm* — Sughrue Mion, PLLC

(57) ABSTRACT

An image processing system includes a portable terminal and an image forming device. The image forming device receives a reading instruction for an image from the portable terminal and transmits data based on the reading instruction to the portable terminal. On condition that the portable terminal was located or is located within a range available for short-range wireless communication of the image forming device, the image forming device and the portable terminal share information which is able to exclusively possess a reading instruction for an image from the portable terminal to the image forming device, and the portable terminal transmits the reading instruction for an image to the image forming device that shares the information which is able to exclusively possess the reading instruction.

10 Claims, 12 Drawing Sheets

(56) References Cited

U.S. PATENT DOCUMENTS

| | | | |
|---|---|---|---|
| 2015/0040187 A1* | 2/2015 | Fujii | H04L 63/08 726/3 |
| 2015/0092233 A1* | 4/2015 | Park | H04N 1/00307 358/1.15 |
| 2015/0153981 A1* | 6/2015 | Iwasaki | G06F 3/1292 358/1.14 |
| 2015/0201091 A1* | 7/2015 | Yokoyama | H04N 1/00307 358/1.15 |
| 2015/0234620 A1* | 8/2015 | Terashima | G06F 3/1292 358/1.15 |

* cited by examiner

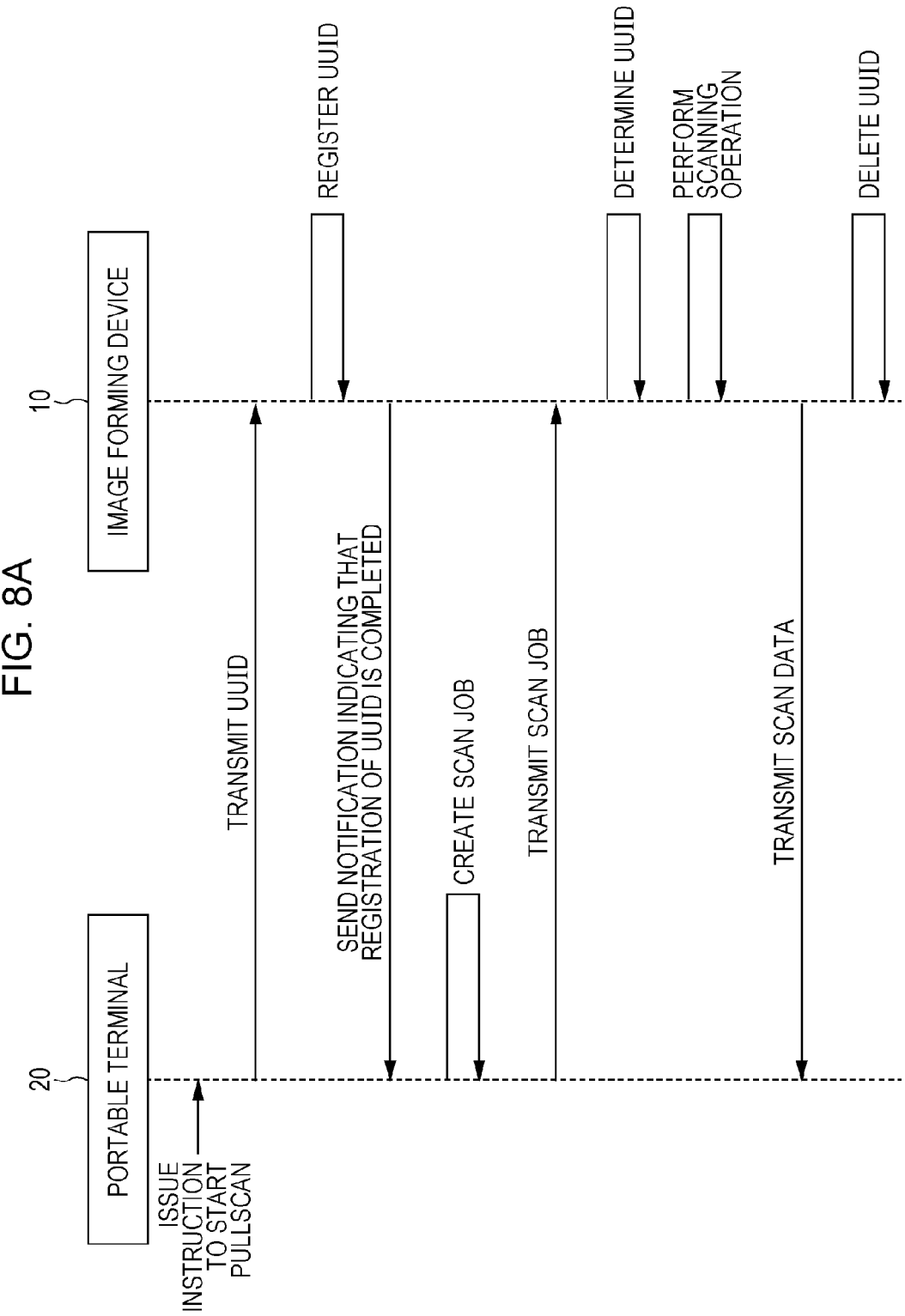

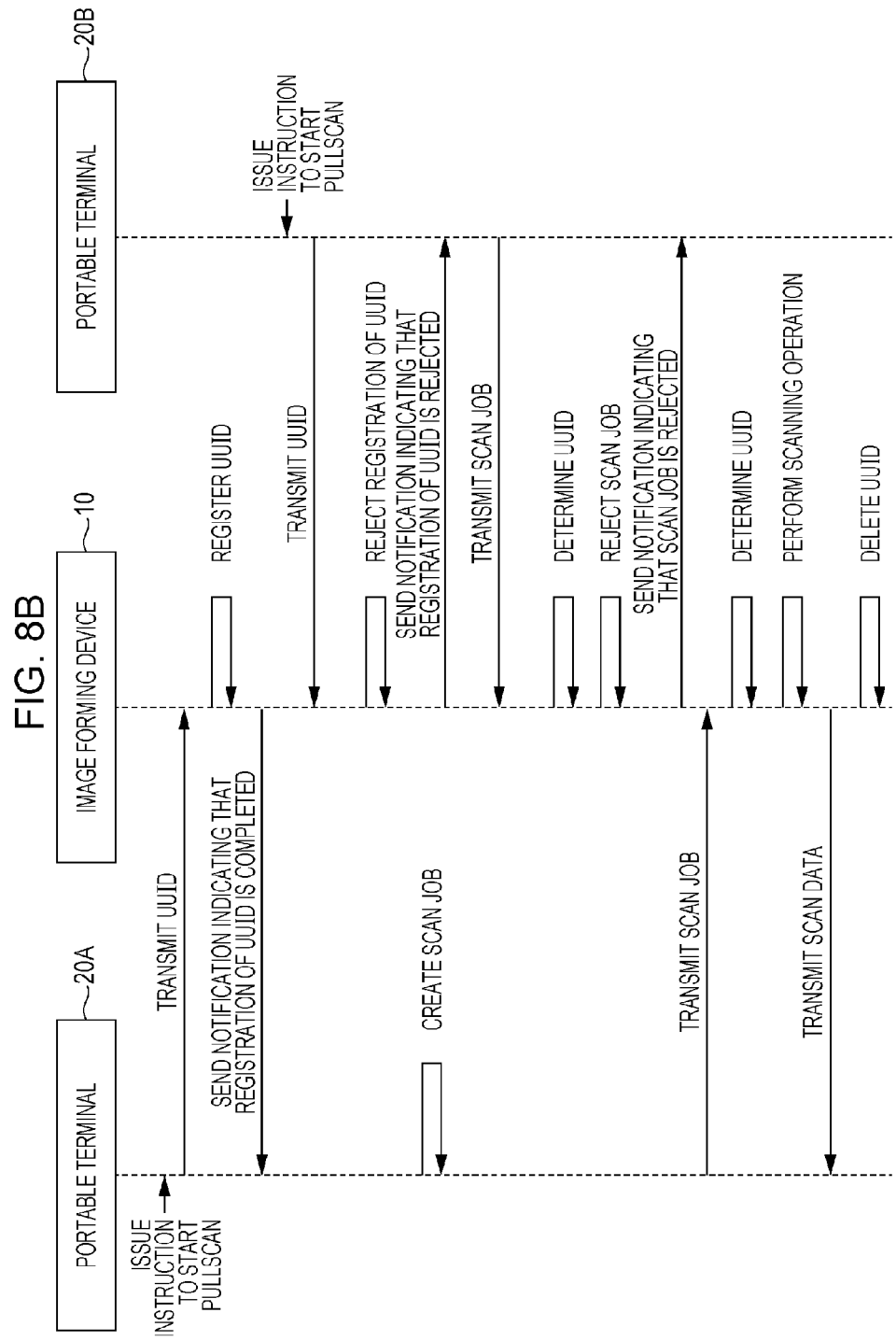

IMAGE PROCESSING SYSTEM, IMAGE FORMING DEVICE, AND IMAGE FORMING METHOD FOR EXCLUSIVE IMAGE PROCESSING

CROSS-REFERENCE TO RELATED APPLICATIONS

This application is based on and claims priority under 35 USC 119 from Japanese Patent Application No. 2015-061514 filed Mar. 24, 2015.

BACKGROUND

The present invention relates to an image processing system, an image forming device, and an image forming method.

SUMMARY

According to an aspect of the invention, there is provided an image processing system including a portable terminal and an image forming device. The image forming device receives a reading instruction for an image from the portable terminal and transmits data based on the reading instruction to the portable terminal. On condition that the portable terminal was located or is located within a range available for short-range wireless communication of the image forming device, the image forming device and the portable terminal share information which is able to exclusively possess a reading instruction for an image from the portable terminal to the image forming device, and the portable terminal transmits the reading instruction for an image to the image forming device that shares the information which is able to exclusively possess the reading instruction.

BRIEF DESCRIPTION OF THE DRAWINGS

Exemplary embodiments of the present invention will be described in detail based on the following figures, wherein:

FIG. 8A is a sequence diagram for explaining an example of an operation of an image processing system according to a second exemplary embodiment;

FIG. 8B is a sequence diagram for explaining an example of an operation of the image processing system according to the second exemplary embodiment;

DETAILED DESCRIPTION

Hereinafter, exemplary embodiments of the present invention will be described in detail with reference to the attached drawings.

First Exemplary Embodiment

System Configuration

Figure 1:
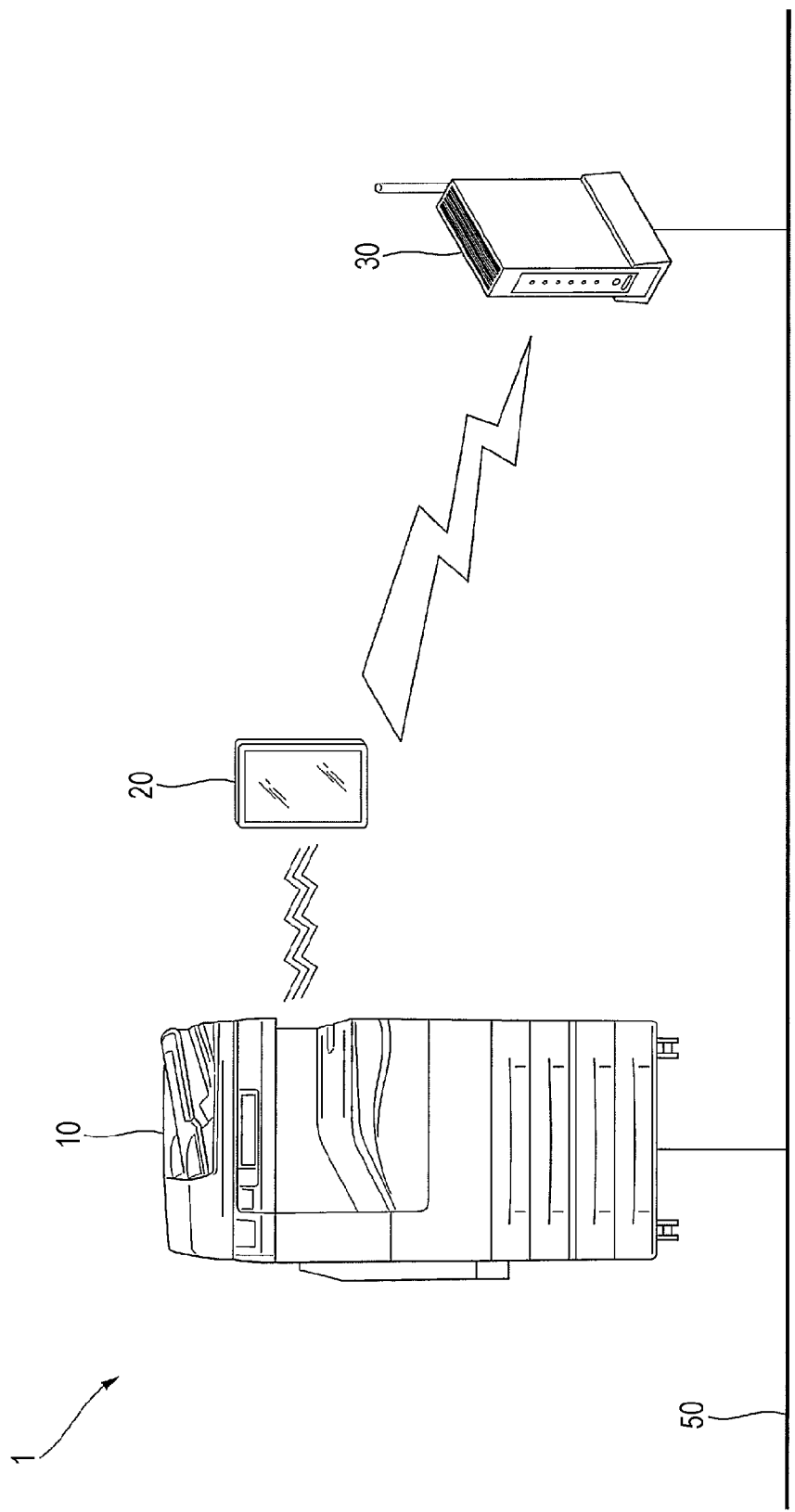
FIG. 1 is a diagram illustrating an example of the entire configuration of an image processing system according to an exemplary embodiment.

First, the entire configuration of an image processing system 1 according to a first exemplary embodiment will be explained. FIG. 1 is a diagram illustrating an example of the entire configuration of the image processing system 1 according to the first exemplary embodiment. As illustrated in FIG. 1, the image processing system 1 includes an image forming device 10 that forms an image in accordance with an instruction from a user and a portable terminal 20 that allows the user to issue an instruction to the image forming device 10 through wireless communication. The image processing system 1 also includes a wireless router 30 that relays wireless communication between the portable terminal 20 and the image forming device 10. The image forming device 10, the portable terminal 20, and the wireless router 30 are connected to a network 50.

In the example illustrated in FIG. 1, the one image forming device 10 is illustrated. However, two or more image forming devices 10 may be connected to the network 50 to form the image processing system 1. Furthermore, in the example illustrated in FIG. 1, the one portable terminal 20 is illustrated. However, two or more portable terminals 20 may be included in the image processing system 1.

The image forming device 10 is a device that has, for example, a scan function, a print function, a copy function, a facsimile function, and the like. The image forming device 10 forms and outputs an image on a recording medium such as paper. The image forming device 10 receives a print job from the portable terminal 20, and performs printing processing based on the received print job. A print job includes image data as a printing target and a control instruction in which settings for the printing processing are described, and is data as a unit of printing processing performed by the image forming device 10.

The portable terminal 20 is a portable computer device to be used for issuing an instruction for execution of various functions of the image forming device 10. For example, a smartphone, a tablet personal computer (PC), a notebook PC, or the like may be used as the portable terminal 20.

The wireless router 30 functions as a base station for wireless communication. The wireless router 30 relays wireless connection between the image forming device 10 and the portable terminal 20.

The network 50 is a communication unit to be used for information communication between the image forming device 10 and the portable terminal 20. For example, a wired/wireless local area network (LAN) may be used as the network 50.

In FIG. 1, the image forming device 10 is connected to the network 50 in a wired manner. However, the image forming device 10 may be wirelessly connected via the wireless router 30.

Furthermore, in the first exemplary embodiment, communication between the image forming device 10 and the portable terminal 20 may be performed without through the network 50. This type of communication includes short-range wireless communication (for example, near-field wireless communication: near field communication (NFC), Bluetooth® low energy (BLE), and the like) which uses a shorter communication range than communication using a wireless LAN. NFC is standards for wireless communication with a communication range of about 10 centimeters. BLE is one of extension specifications of Bluetooth which is a short-range wireless communication technique and additionally formulated for Bluetooth 4.0. Bluetooth is a technology of short-range wireless communication which uses a frequency band of 2.4 GHz, and the communication distance between devices which perform Bluetooth communication is normally about 10 meters. Furthermore, for BLE, a reduction in the power consumption is achieved with the maximum packet size of 27 bytes and the maximum data transfer speed of 1 Mbps. Hereinafter, in the first exemplary embodiment, the case where BLE is used as an example of the short-range wireless communication will be explained as an example.

Hardware Configuration of Image Forming Device

Figure 2:
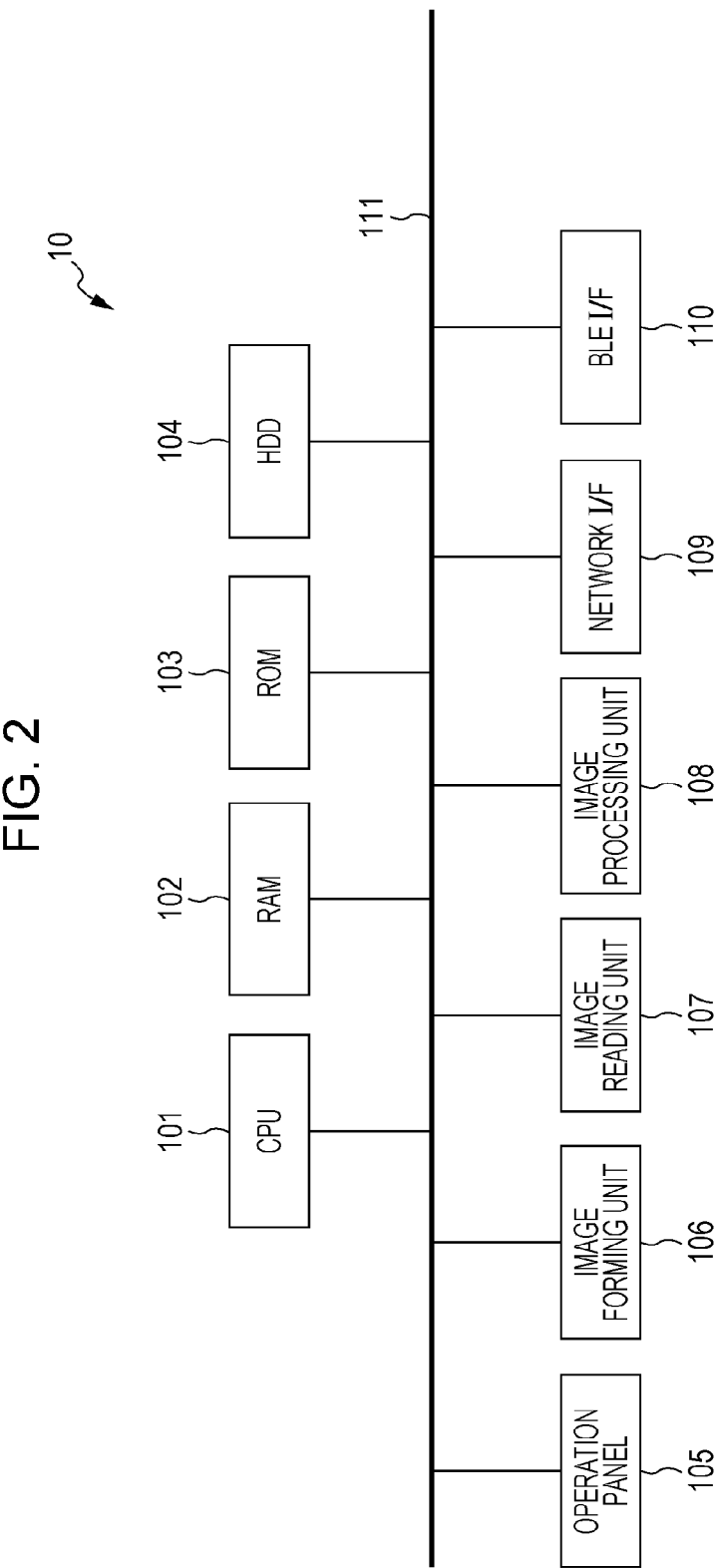
FIG. 2 is a diagram illustrating an example of the hardware configuration of an image forming device.

Next, the hardware configuration of the image forming device 10 will be described. FIG. 2 is a diagram illustrating an example of the hardware configuration of the image forming device 10. As illustrated in FIG. 2, the image forming device 10 includes a central processing unit (CPU) 101, a random access memory (RAM) 102, a read only memory (ROM) 103, a hard disk drive (HDD) 104, which is a magnetic disk device, an operation panel 105, an image forming unit 106, an image reading unit 107, an image processing unit 108, a network interface (hereinafter, referred to as a network I/F) 109, and a BLE interface (hereinafter, referred to as a BLE I/F) 110. The above functional units are connected to a bus 111 so that data is transferred among them via the bus 111.

The CPU 101 executes various types of software including an operating system (OS) and an application program to implement various functions described later. The RAM 102 is a memory that is used as an operation memory and the like for the CPU 101. The ROM 103 is a memory that stores various programs and the like executed by the CPU 101. When the CPU 101 loads the various programs stored in the ROM 103 or the like onto the RAM 102 and executes the programs, the functions of the image forming device 10 may be implemented.

The HDD 104 stores image data and the like to be used for an image forming operation by the image forming unit 106.

A program to be executed by the CPU 101 may be stored in advance in the ROM 103 or may be stored in a computer-readable recording medium such as a magnetic recording medium (a magnetic tape, a magnetic disk, etc.), an optical recording medium (an optical disc etc.), a magneto-optical recording medium, or a semiconductor memory and supplied. Furthermore, the program to be executed by the CPU 101 may be supplied to the CPU 101, for example, via the network 50.

The operation panel 105 is a touch panel that displays various types of information and receives an operation input from a user. The operation panel 105 includes a display on which various types of information are displayed and a position detection sheet for detecting a position touched with a finger, a stylus pen, or the like. Any type of unit such as a unit for performing detection based on the pressure caused by touch or a unit for performing detection based on static electricity of an object that touches the operation panel 105 may be used as the unit for detecting the touched position. Furthermore, instead of the touch panel, an input unit such as a display and a keyboard may be used.

The image forming unit 106 forms an image on a recording medium. The image forming unit 106 is, for example, a printer of an electrophotographic system for transferring a toner attached to a photoreceptor to a recording medium to form an image or an ink jet system for discharging ink to a recording medium to form an image.

The image reading unit 107 reads an image recorded on a recording medium and generates image data representing the read image. The image reading unit 107 is, for example, a scanner of a charge coupled devices (CCD) system for causing reflected light with respect to light applied from a light source to an original to be reduced through a lens and causing the reflected light to be received by the CCD or a contact image sensor (CIS) system for causing reflected light with respect to light sequentially applied from a light-emitting diode (LED) light source to an original to be received by the CIS.

The image processing unit 108 performs various types of image processing, such as color correction and gradation correction, on image data input. For example, the image processing unit 108 performs various types of image processing on image data read by the image reading unit 107 and image data stored in the HDD 104, and outputs the processed image data to the image forming unit 106.

The network I/F 109 functions as a communication interface that allows transmission and reception of various data through the network 50 to and from devices on the network 50. The network I/F 109 allows transmission and reception of data by wired or wireless connection, irrespective of wired or wireless connection.

The BLE I/F 110 functions as a communication interface that allows BLE communication with the portable terminal 20 which is provided with a BLE communication function, and includes an antenna to be used for BLE communication. The BLE I/F 110 allows transmission and reception of data which has a relatively small amount compared to data transmitted and received via the network I/F 109, to and from the portable terminal 20 through BLE communication.

Hardware Configuration of Portable Terminal

Figure 3:
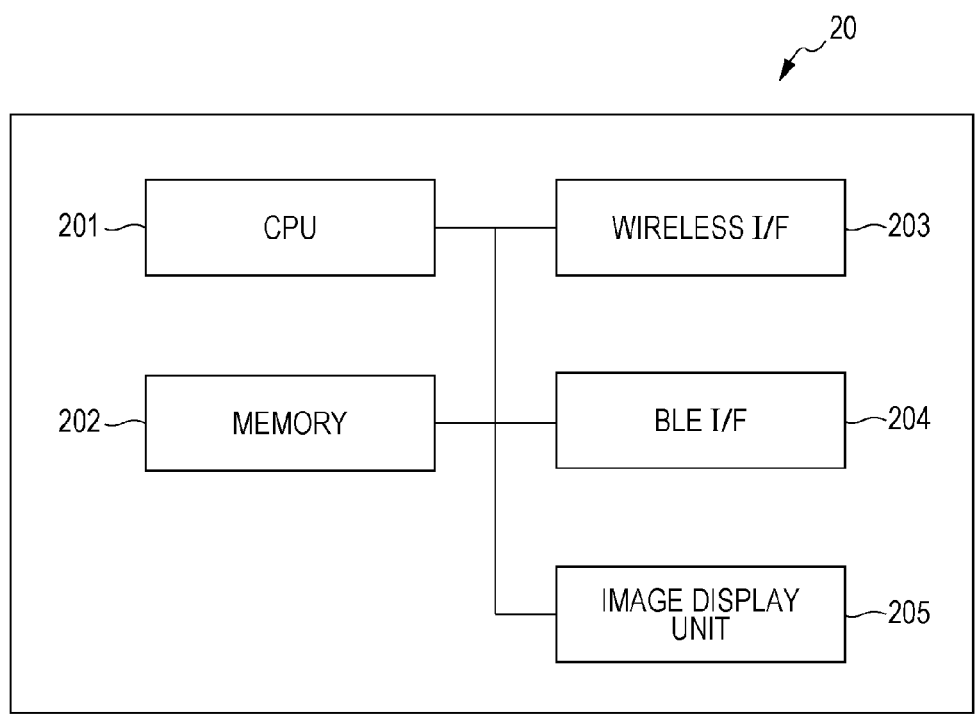
FIG. 3 is a diagram illustrating an example of the hardware configuration of a portable terminal.

FIG. 3 is a diagram illustrating an example of the hardware configuration of the portable terminal 20. As illustrated in FIG. 3, the portable terminal 20 includes a CPU 201 and a memory 202 serving as a storing unit. The CPU 201 executes various types of software including an OS and an application program to implement various functions described later. The memory 202 also has a storage region in which various types of software, data to be used for execution of the software, and the like are stored.

A program to be executed by the CPU 201 may be stored in advance in the memory 202 or may be stored in a computer-readable recording medium such as a magnetic recording medium (a magnetic tape, a magnetic disk, etc.), an optical recording medium (an optical disc etc.), a magneto-optical recording medium, or a semiconductor memory and supplied. Furthermore, the program to be executed by the CPU 201 may be supplied to the CPU 201, for example, via the Internet.

The portable terminal 20 also includes a wireless I/F 203 and a BLE I/F 204 which allow wireless communication with an external device, and an image display unit 205 on which an image is displayed.

The wireless I/F 203 allows wireless communication with the image forming device 10 via the network 50, and functions as a communication interface which allows transmission and reception of various data.

The BLE I/F 204 functions as a communication interface that allows BLE communication with the image forming device 10, and includes an antenna to be used for BLE communication. The BLE I/F 204 allows transmission and reception of data which has a relatively small amount compared to data transmitted and received via the wireless I/F 203, to and from the image forming device 10 through BLE communication The image display unit 205 is, for example, a touch panel. The image display unit 205 therefore includes a liquid crystal panel and a position detection part (not illustrated in FIG. 3) for detecting the position on the liquid crystal panel that is touched with an object typified by a human finger or stylus pen when the object touches the liquid crystal panel. The touch panel used in the first exemplary embodiment is not particularly limited. Various types of touch panel including a resistive film type or an electrostatic capacitance type may be adopted.

The portable terminal 20 may include, for example, an HDD, a flash memory, and the like as a storing unit. The HDD and the flash memory store input data input to various types of software, output data output from the various types of software, and the like. The portable terminal 20 may also include an input device including a keyboard, a mouse, and the like.

In the image processing system 1 described above, the image forming device 10 and the portable terminal 20 perform transmission and reception of data in accordance with the amount and type of communication data through wireless communication or BLE communication.

Functional Configuration of Image Forming Device

Next, the functional configuration of the image forming device 10 will be described.

In the first exemplary embodiment, the image forming device 10 performs processing for executing pull-scanning (PullScan) from the portable terminal 20. The "PullScan" generally represents processing for performing a scanning operation by causing a PC device or the like to issue a scanning instruction to a multifunction machine which has an image reading (scanner) function. In the first exemplary embodiment, as PullScan processing, the portable terminal 20 transmits to the image forming device 10 a reading instruction (hereinafter, may also be referred to as a scan job) for reading an original. After the image forming device 10 completes a reading operation (hereinafter, may also be referred to as a scanning operation) in response to the transmission of the reading instruction, a read document (hereinafter, may also be referred to as scan data) is transmitted to a storage location indicated in the scan job.

For execution of PullScan, a user needs to place an original on the image forming device 10 and then issue an instruction. However, during the time between placing of the original on the image forming device 10 and issuance of the instruction, another user may start scanning via another terminal connected to the network 50.

In the first exemplary embodiment, only the portable terminal 20 that is located within a communication range available for BLE communication with the image forming device 10 is able to execute PullScan.

Figure 4:
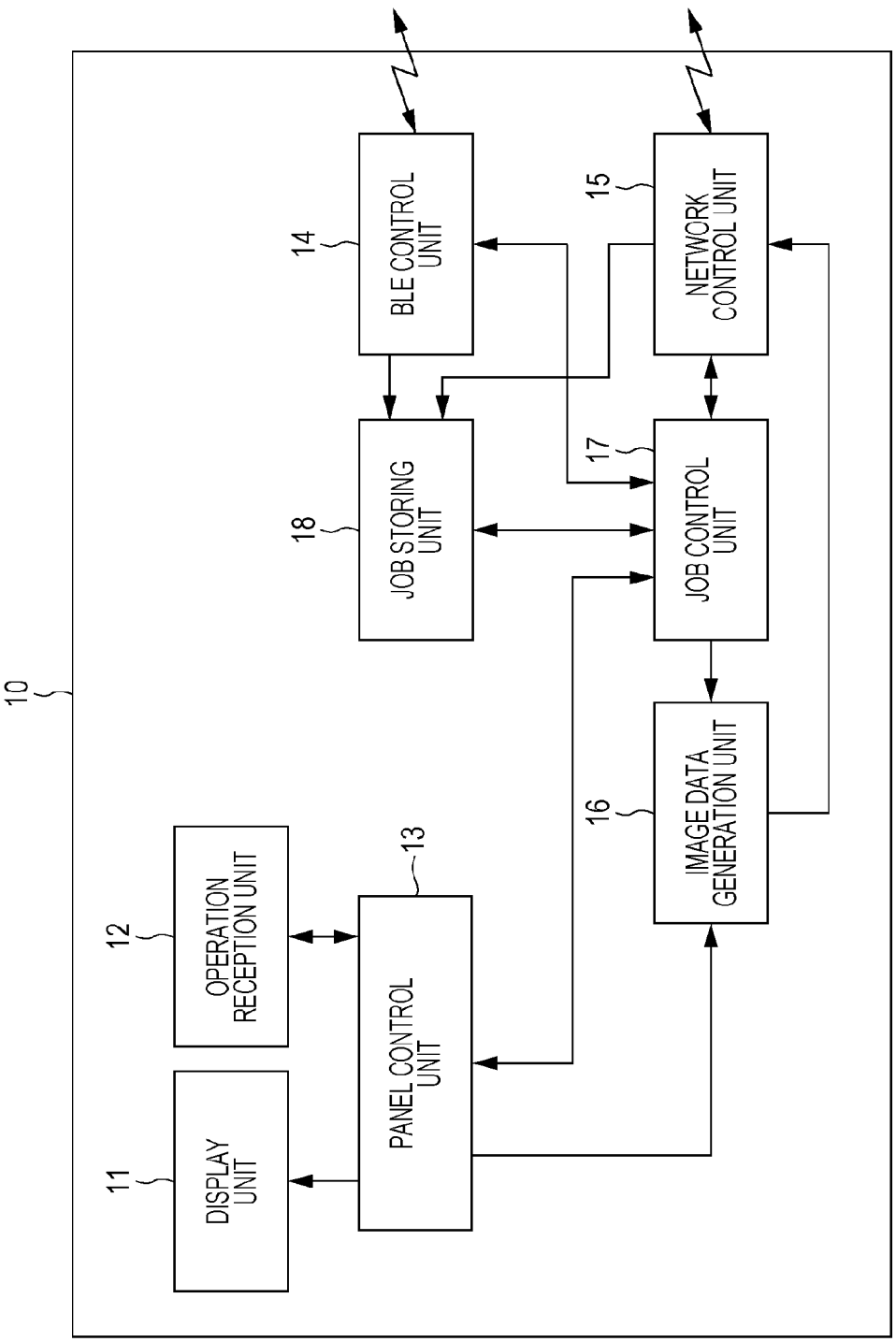
FIG. 4 is a block diagram illustrating an example of the functional configuration of an image forming device.

FIG. 4 is a block diagram illustrating an example of the functional configuration of the image forming device 10. The image forming device 10 includes a display unit 11, an operation reception unit 12, a panel control unit 13, a BLE control unit 14, a network control unit 15, and an image data generation unit 16. The image forming device 10 also includes a job control unit 17 that performs control such that a job only from the portable terminal 20 that is located within a range available for short-range wireless communication is to be executed. The image forming device 10 also includes a job storing unit 18 in which a scan job and information for determining whether or not to execute a scan job are stored.

The display unit 11 displays various images including a message to a user, for example, on the operation panel 105 under the control of the panel control unit 13.

The operation reception unit 12 receives an operation input by a user, for example, when the user touches the operation panel 105.

The panel control unit 13 controls the operation of the display unit 11 and the operation reception unit 12.

The BLE control unit 14, which is an example of a transmission unit for transmitting authentication information, performs transmission and reception of data through BLE communication. For example, the BLE control unit 14 continues to transmit, through BLE communication, an advertising packet including a random character string (hereinafter, may also be referred to as a one-time passwords (one-time PWD)), which is an example of authentication information, to a device that exists within a range available for BLE communication. An advertising packet represents a packet transmitted by a device for notifying a surrounding terminal available for BLE communication of the presence of the device. A one-time password represents a password which is issued for access and is valid in a limited state, such as only once or only within a certain time. In the first exemplary embodiment, as an example of information which may exclusively possess authentication information or an image reading instruction, a case using a one-time password will be explained.

The network control unit 15, which is an example of an instruction reception unit that receives a reading instruction and a data transmission unit that transmits read data, performs transmission and reception of data through wireless communication via the wireless router 30. For example, the network control unit 15 receives a scan job, which is an example of a reading instruction, from the portable terminal 20, and transmits scan data, which is an example of read data, obtained by execution of the scan job to the portable terminal 20.

The image data generation unit 16, which is an example of a reading execution unit that executes reading, reads an image recorded on a recording medium, and generates image data.

The job control unit 17 causes data transmitted or received by the BLE control unit 14 and the network control unit 15 to be stored into the job storing unit 18. The job control unit 17 causes the image data generation unit 16 to generate image data based on a result obtained by comparison with stored data.

The panel control unit 13, the BLE control unit 14, the network control unit 15, and the job control unit 17 in the image forming device 10 are implemented by a program executed by the CPU 101 illustrated in FIG. 2. The display unit 11 and the operation reception unit 12 are implemented by the operation panel 105 illustrated in FIG. 2. The BLE control unit 14 is implemented by the BLE I/F 110 illustrated in FIG. 2. The network control unit 15 is implemented by the network I/F 109 illustrated in FIG. 2. The image data generation unit 16 is implemented by the image reading unit 107 illustrated in FIG. 2. The job storing unit 18 is implemented by the HDD 104 illustrated in FIG. 2.

Functional Configuration of Portable Terminal

Figure 5:
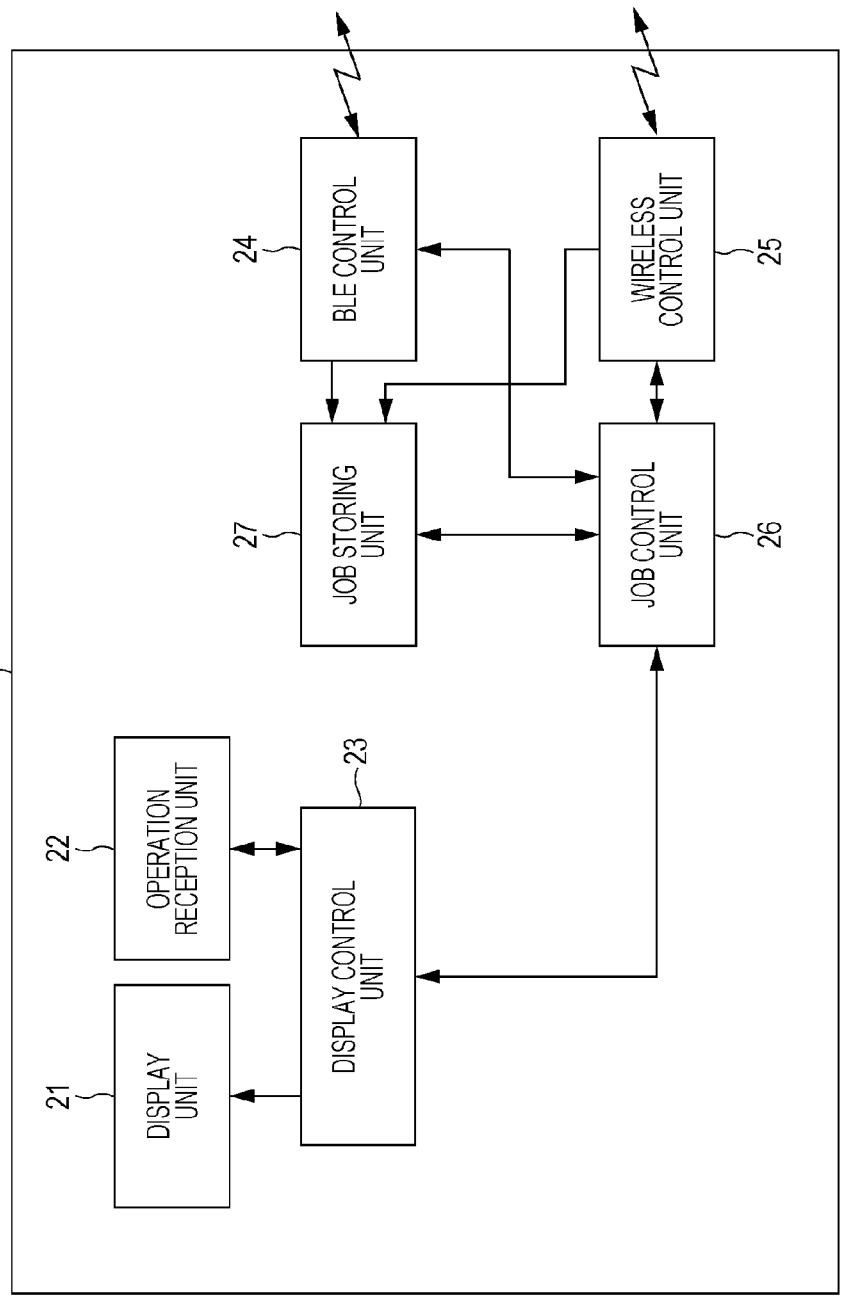
FIG. 5 is a block diagram illustrating an example of the functional configuration of a portable terminal.

Next, the functional configuration of the portable terminal 20 will be described. FIG. 5 is a block diagram illustrating an example of the functional configuration of the portable terminal 20. The portable terminal 20 includes a display unit 21 that displays an image, an operation reception unit 22 that receives an operation input from a user, a display control unit 23 that controls the display of the portable terminal 20, a BLE control unit 24 that controls transmission and reception through BLE communication, a wireless control unit 25 that controls transmission and reception through wireless communication, a job control unit 26 that performs control such that the image forming device 10 available for short-range wireless communication executes a job, and a job storing unit 27 that stores information related to a job.

The display unit 21 displays various images including a message for a user, for example, on the image display unit 205 illustrated in FIG. 3 under the control of the display control unit 23.

The operation reception unit 22 receives an operation input from a user, for example, when the user touches the image display unit 205.

The display control unit 23 controls the operation of the display unit 21 and the operation reception unit 22.

The BLE control unit 24 performs transmission and reception of data through BLE communication. In the first exemplary embodiment, the BLE control unit 24 receives an advertising packet including a one-time password from the image forming device 10 through BLE communication.

The wireless control unit 25 performs transmission and reception of data through wireless communication via the wireless router 30. In the first exemplary embodiment, the wireless control unit 25 transmits a scan job to the image forming device 10 and receives data obtained by execution of the scan job from the image forming device 10.

The job control unit 26 causes the job storing unit 27 to store data transmitted and received from the BLE control unit 24 and the wireless control unit 25. The job control unit 26 creates a job based on transmitted or received data and controls transmission of the job. In the first exemplary embodiment, the job control unit 26 stores a one-time password included in the received advertising packet into the job storing unit 27, which is an example of a storing unit. The job control unit 26 also creates a scan job including the received one-time password and delivers the created scan job to the wireless control unit 25.

The display control unit 23, the BLE control unit 24, the wireless control unit 25, and the job control unit 26 in the portable terminal 20 are implemented by a program executed by the CPU 201 illustrated in FIG. 3. The display unit 21 and the operation reception unit 22 are implemented by the image display unit 205 illustrated in FIG. 3. The BLE control unit 24 is implemented by the BLE I/F 204 illustrated in FIG. 3. The wireless control unit 25 is implemented by the wireless I/F 203 illustrated in FIG. 3. The job storing unit 27 is implemented by the memory 202 illustrated in FIG. 3, the HDD, and the like.

Operation of Image Processing System

Figure 6:
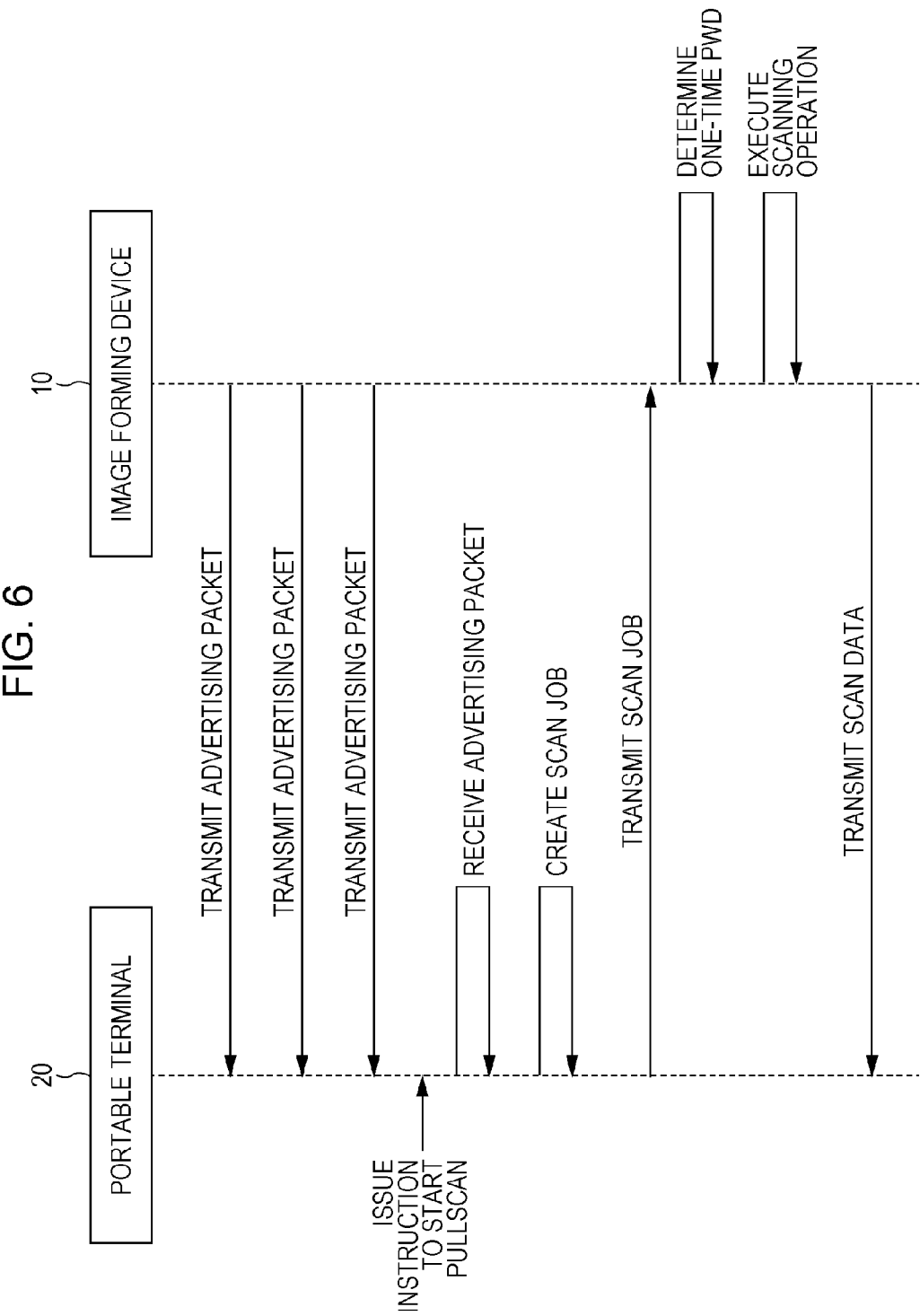
FIG. 6 is a sequence diagram for explaining an example of an operation of an image processing system according to a first exemplary embodiment.
Figure 7A:
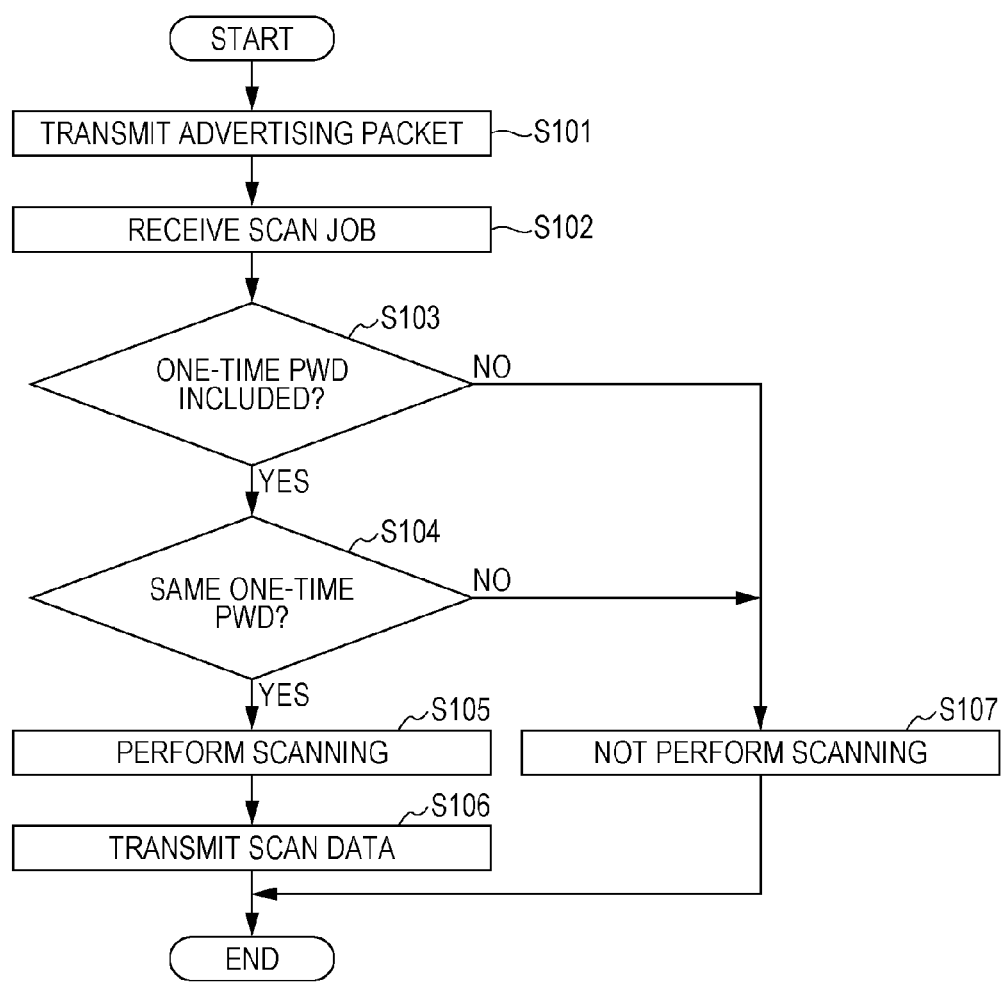
FIG. 7A is a flowchart for explaining an example of a processing procedure by the image processing system according to the first exemplary embodiment.
Figure 7B:
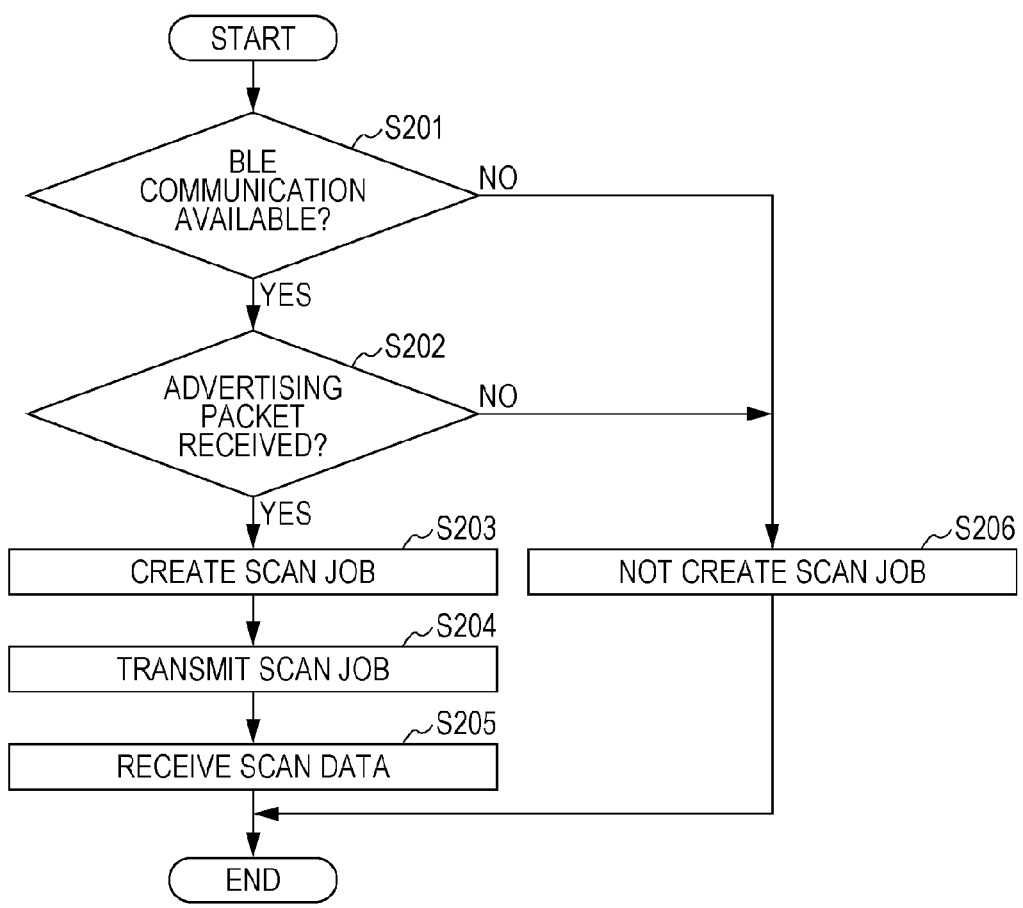
FIG. 7B is a flowchart for explaining an example of a processing procedure by the image processing system according to the first exemplary embodiment.

Next, an operation of the image processing system 1 will be explained. FIG. 6 is a sequence diagram for explaining an example of an operation of the image processing system 1 according to the first exemplary embodiment. FIGS. 7A and 7B are flowcharts for explaining examples of a processing procedure by the image processing system 1 according to the first exemplary embodiment. FIG. 7A illustrates an example of a processing procedure of the image forming device 10, and FIG. 7B illustrates an example of a processing procedure of the portable terminal 20.

First, an example of an operation of each device in the image processing system 1 will be explained with reference to the sequence diagram of FIG. 6.

The image forming device 10 continues to transmit advertising packets each including a one-time password (one-time PWD) using the BLE communication function. In response to an instruction from a user for starting PullScan, the portable terminal 20 receives an advertising packet including a one-time password from the image forming device 10 through BLE communication. Furthermore, the portable terminal 20 creates a scan job to which the one-time password included in the advertising packet has been added thereto. Then, the portable terminal 20 transmits the created scan job to the image forming device 10 through wireless communication through the wireless router 30.

Meanwhile, in response to the transmission of the scan job from the portable terminal 20, the image forming device 10 determines the one-time password included in the scan job, and then performs a scanning operation. Furthermore, the image forming device 10 transmits scan data obtained by the scanning operation to the portable terminal 20 through wireless communication via the wireless router 30.

Since BLE communication is performed at the time when the portable terminal 20 receives an advertising packet, it is necessary for the portable terminal 20 to be located within a communication range available for short-range wireless communication of the image forming device 10. In contrast, since wireless communication via the wireless router 30 is used at the time when the portable terminal 20 transmits the scan job, the portable terminal 20 is not necessarily located within the communication range for BLE communication.

That is, on condition that the portable terminal 20 was located or is located within the range available for short-range wireless communication of the image forming device 10, the image forming device 10 and the portable terminal 20 share information that may exclusively possess an image reading instruction, and transmit and receive the image reading instruction using the information that may exclusively possess the image reading instruction.

Next, operations performed by the image forming device 10 and the portable terminal 20 will be described in detail with reference to the flowcharts of FIGS. 7A and 7B.

As illustrated in FIG. 7A, the BLE control unit 14 of the image forming device 10 transmits an advertising packet including a one-time password through BLE communication (step 101). Next, the network control unit 15 of the image forming device 10 receives a scan job through wireless communication via the wireless router 30 (step 102), and the job control unit 17 determines whether or not the scan job includes a one-time password (step 103). When the scan job includes a one-time password (Yes in step 103), the job control unit 17 determines whether or not the one-time password included in the scan job is the same as the one-time password transmitted by the BLE control unit 14 (step 104). When the one-time passwords are the same (Yes in step 104), the job control unit 17 causes the image data generation unit 16 to perform a scanning operation (step 105). Then, the scan data obtained by the scanning operation is transmitted to the portable terminal 20 via the network control unit 15 (step 106), and the process ends.

In contrast, when the scan job does not include a one-time password (No in step 103) or when the one-time passwords are not the same (No in step 104), the job control unit 17 does not cause the image data generation unit 16 to perform a scanning operation (step 107), and the process ends.

Next, an operation of the portable terminal 20 will be explained in association with an operation of the image forming device 10 with reference to FIG. 7B.

When the portable terminal 20 of a user who wants to perform PullScan enters an area available for BLE communication of the image forming device 10, BLE communication with the image forming device 10 becomes available (Yes in step 201). Then, as illustrated as step 101 of FIG. 7A, when the BLE control unit 14 of the image forming device 10 transmits an advertising packet including a one-time password, the BLE control unit 24 of the portable terminal 20 receives the advertising packet (Yes in step 202). The job control unit 26 stores the one-time password included in the advertising packet into the job storing unit 27, and creates a scan job including the one-time password added thereto (step 203). The wireless control unit 25 transmits, through wireless communication via the wireless router 30, the created scan job to the image forming device 10 (step 204). Then, as illustrated as step 102 of FIG. 7A, the network control unit 15 of the image forming device 10 receives the scan job through wireless communication.

After that, when the network control unit 15 of the image forming device 10 transmits scan data as illustrated as step 106 of FIG. 7A, the wireless control unit 25 of the portable terminal 20 receives the scan data (step 205), and the process ends.

In contrast, when the portable terminal 20 is not able to perform BLE communication with the image forming device 10 (No in step 201) or when the BLE control unit 24 of the portable terminal 20 does not receive an advertising packet (No in step 202), the job control unit 26 does not create a scan job (step 206), and the process ends. The case where the portable terminal 20 is not able to perform BLE communication with the image forming device 10 includes, for example, the case where the portable terminal 20 is located outside an area available for BLE communication with the image forming device 10, the case where a temporary trouble occurs in one or the other device, and the like.

Furthermore, in order to cause the image forming device 10 not to perform a scanning operation when a scan job is created using a previously obtained one-time password, a one-time password transmitted in step 101 may be changed after a certain time has passed.

As described above, the image processing system 1 according to the first exemplary embodiment is configured to exclusively use the image forming device 10 and perform a reading instruction by causing the image forming device 10 and the portable terminal 20 to share a one-time password included in an advertising packet. Therefore, PullScan from a terminal that does not receive an advertising packet including a one-time password may be prevented.

Second Exemplary Embodiment

Next, a second exemplary embodiment will be described. In the first exemplary embodiment, the configuration in which a scanning operation is performed by using a one-time password transmitted by the image forming device 10 through BLE communication is described. In the first exemplary embodiment, when plural portable terminals 20 that are able to perform BLE communication with the image forming device 10 exist, each of the portable terminals 20 is able to create a scan job including a one-time password. Then, the portable terminal 20 that transmits a scan job to the image forming device 10 earlier may perform PullScan, and PullScan may be performed from a device that is different from the portable terminal 20 of a user who places an original on the image forming device 10. In the second exemplary embodiment, by using identification information for identifying the portable terminal 20, PullScan from the identified portable terminal 20 is performed.

The second exemplary embodiment differs from the first exemplary embodiment in that the BLE control unit 14 functions as an example of an information reception unit that receives identification information for identifying the portable terminal 20 through short-range wireless communication and an example of a notification unit that notifies the registration status of the identification information, and receives a universally unique identifier (UUID) or the like as an example of information which may exclusively possess the identification information or a reading instruction for an image from the portable terminal 20 that is located within a range available for BLE communication. A UUID is an identifier of the portable terminal 20 and is used for uniquely identifying the portable terminal 20. In the second exemplary embodiment, as an example of information which may exclusively possess identification information for identifying the portable terminal 20 or a reading instruction for an image, the case using a UUID will be explained.

In the second exemplary embodiment, elements similar to those in the first exemplary embodiment will be referred to with the same reference signs and detailed explanation for those elements will be omitted.

The job control unit 17 illustrated in FIG. 4 performs control such that a job only from the portable terminal 20 that is located within a range available for short-range wireless communication is to be executed, as in the first exemplary embodiment. In the second exemplary embodiment, the job control unit 17 functions as an example of a registration unit that registers identification information for identifying the portable terminal 20, and performs control such that a job from the portable terminal 20 identified by a UUID. The UUID registered by the job control unit 17 is stored in the job storing unit 18.

The BLE control unit 24 illustrated in FIG. 5 performs transmission and reception of data through BLE communication, as in the first exemplary embodiment. In the second exemplary embodiment, the BLE control unit 24 transmits a UUID, and receives a notification regarding registration of a UUID, a scan job rejection notification, and the like.

The job control unit 26 performs control such that the image forming device 10 available for short-range wireless communication executes a job, as in the first exemplary embodiment. In creation of a scan job, a UUID of the portable terminal 20 is added, instead of a one-time password.

Operation of Image Processing System

Figure 9A:
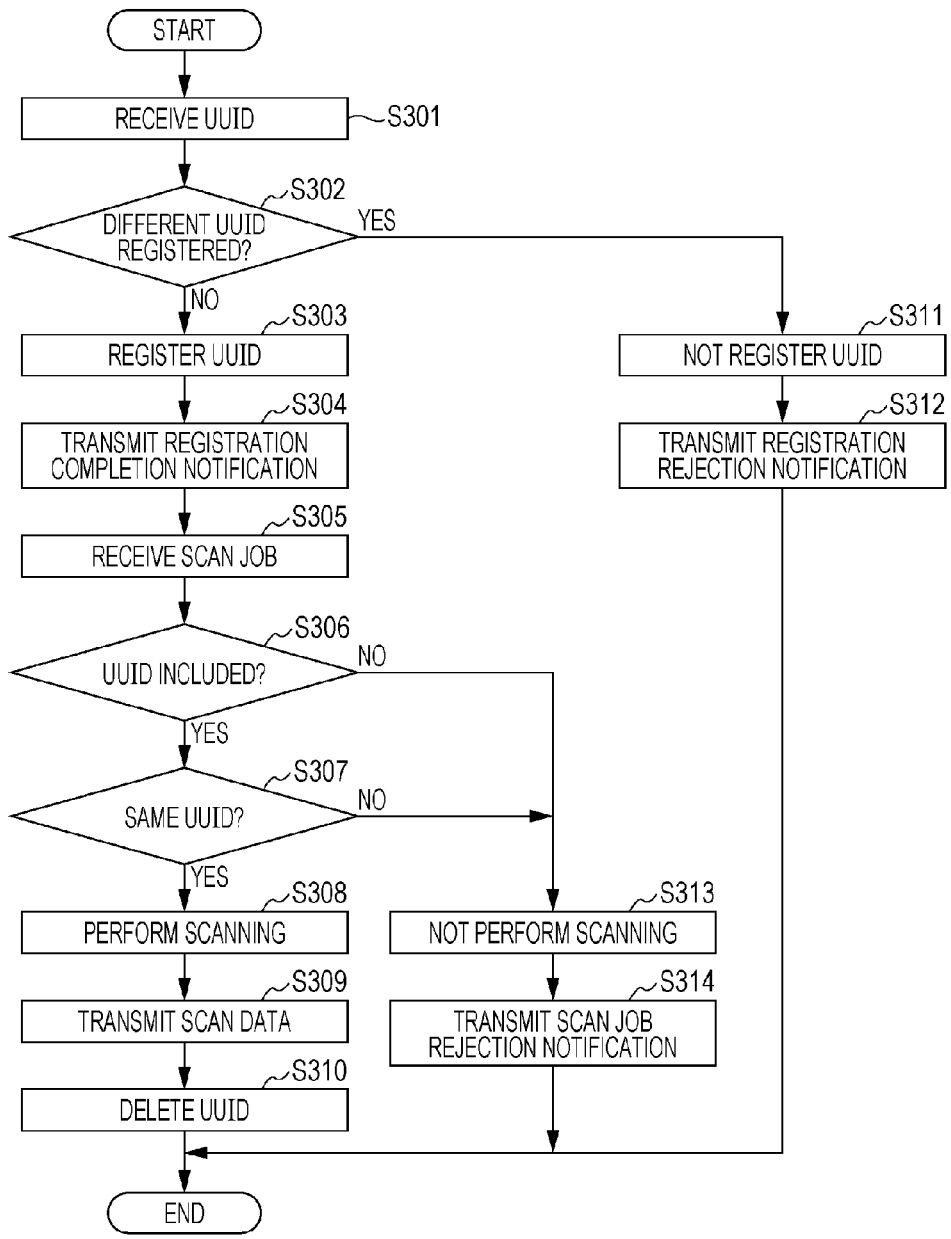
FIG. 9A is a flowchart for explaining an example of a processing procedure by the image processing system according to the second exemplary embodiment.
Figure 9B:
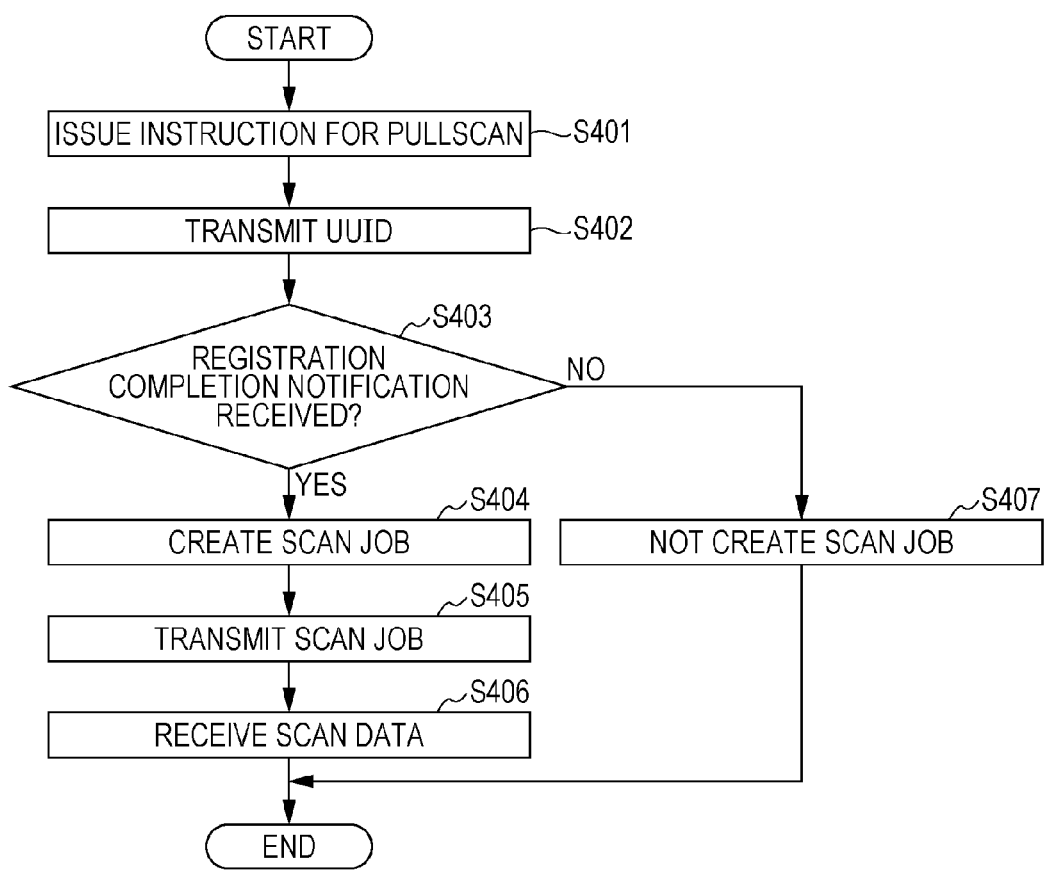
FIG. 9B is a flowchart for explaining an example of a processing procedure by the image processing system according to the second exemplary embodiment.

First, an operation of the image processing system 1 will be explained. FIGS. 8A and 8B are sequence diagrams for explaining examples of an operation of the image processing system 1 according to the second exemplary embodiment. FIG. 8A illustrates an example of an operation of the image processing system 1 that includes the image forming device 10 and the portable terminal 20, and FIG. 8B illustrates an example of an operation of the image processing system 1 that includes the image forming device 10 and two portable terminals 20 (portable terminals 20A and 20B). FIGS. 9A and 9B are flowcharts for explaining examples of a processing procedure by the image processing system 1 according to the second exemplary embodiment. FIG. 9A illustrates an example of a processing procedure of the image forming device 10, and FIG. 9B illustrates an example of a processing procedure of the portable terminal 20.

First, an example of an operation of each device in the image processing system 1 will be described with reference to the sequence diagram of FIG. 8A.

First, in response to an instruction from a user for starting PullScan from the portable terminal 20, the portable terminal 20 transmits a UUID of the portable terminal 20 to the image forming device 10 through BLE communication. Then, the image forming device 10 registers the transmitted UUID, and notifies the portable terminal 20 of completion of registration of the UUID. After that, the portable terminal 20 creates a scan job including the UUID of the portable terminal 20 added thereto, and transmits the scan job to the image forming device 10 through wireless communication via the wireless router 30.

The image forming device 10 determines the UUID included in the scan job, and then performs a scanning operation. The image forming device 10 transmits scan data obtained by the scanning operation to the portable terminal 20 through wireless communication via the wireless router 30. After that, the image forming device 10 deletes the registered UUID.

Since BLE communication is performed at the time when the portable terminal 20 transmits the UUID, it is necessary for the portable terminal 20 to be located within a communication range available for short-range wireless communication of the image forming device 10. In contrast, since wireless communication via the wireless router 30 is used at the time when the portable terminal 20 transmits the scan job, the portable terminal 20 is not necessarily located within the communication range for BLE communication.

That is, on condition that the portable terminal 20 was located or is located within the range available for short-range wireless communication of the image forming device 10, the image forming device 10 and the portable terminal 20 share information that may exclusively possess an image reading instruction, and transmit and receive the image reading instruction using the information that may exclusively possess the image reading instruction.

During the time between transmission of the UUID of the portable terminal 20 and transmission of the scan job, a different portable terminal 20 may transmit the UUID of the different portable terminal 20 to the image forming device 10. That is, two or more portable terminals 20 may try to perform PullScan. An example of this case will be explained below in which the portable terminal 20 that has already transmitted the UUID is represented as the portable terminal 20A and the portable terminal 20 that is going to transmit the UUID is represented as the portable terminal 20B.

An example of the operation of the image processing system 1 that includes the image forming device 10 and the two portable terminals 20A and 20B will be explained with reference to the sequence diagram of FIG. 8B. An explanation for processing similar to that in FIG. 8A will be omitted.

It is assumed that after the portable terminal 20A transmits the UUID of the portable terminal 20A and the image forming device 10 transmits a notification indicating that registration of the UUID is completed, the different portable terminal 20B transmits the UUID of the portable terminal 20B to the image forming device 10 through BLE communication, in response to an instruction for starting PullScan. Then, the image forming device 10 rejects registration of the UUID of the portable terminal 20B, and notifies the portable terminal 20B of the rejection of registration of the UUID. Furthermore, when the portable terminal 20B transmits a scan job including the UUID of the portable terminal 20B added thereto to the image forming device 10 through wireless communication via the wireless router 30, the image forming device 10 determines the UUID included in the scan job, and rejects the scan job. Then, the image forming device 10 transmits a scan job rejection notification to the portable terminal 20B.

After that, when the portable terminal 20A transmits a scan job, processing similar to that illustrated in FIG. 8A is performed.

Next, operations performed by the image forming device 10 and the portable terminal 20 will be explained in detail with reference to the flowcharts of FIGS. 9A and 9B.

As illustrated in FIG. 9A, the BLE control unit 14 of the image forming device 10 receives a UUID from the portable terminal 20 through BLE communication (step 301). Then, the job control unit 17 of the image forming device 10 determines whether or not a UUID of a different terminal is registered in the job storing unit 18 (step 302). When a UUID of a different terminal is not registered (No in step 302), the job control unit 17 registers the UUID of the portable terminal 20 into the job storing unit 18 (step 303), and causes the BLE control unit 14 to transmit a registration completion notification (step 304). Next, the network control unit 15 of the image forming device 10 receives a scan job through wireless communication via the wireless router 30 (step 305). Then, the job control unit 17 of the image forming device 10 determines whether or not the scan job includes a UUID (step 306). When it is determined that the scan job includes a UUID (Yes in step 306), the job control unit 17 determines whether or not the UUID included in the scan job is the same as the registered UUID (step 307). When it is determined that the UUIDs are the same (Yes in step 307), the job control unit 17 causes the image data generation unit 16 to perform a scanning operation (step 308). Then, the job control unit 17 transmits scan data obtained by the scanning operation to the portable terminal 20A via the network control unit 15 (step 309). After that, the job control unit 17 deletes the UUID registered in the job storing unit 18 (step 310), and the process ends.

In contrast, when a UUID of a different terminal is registered in the job storing unit 18 (Yes in step 302), the job control unit 17 does not register the UUID of the portable terminal 20 (step 311), and causes the BLE control unit 14 to transmit a registration rejection notification (step 312). When it is determined that the scan job does not include a UUID (No in step 306) or when it is determined that UUIDs are not the same (No in step 307), the job control unit 17 does not cause the image data generation unit 16 to perform a scanning operation (step 313), and causes the BLE control unit 14 to transmit a scan job rejection notification (step 314).

Next, an operation of the portable terminal 20 will be explained in association with an operation of the image forming device 10 with reference to FIG. 9B.

First, an instruction for PullScan is issued from the portable terminal 20 (step 401). Then, the BLE control unit 24 of the portable terminal 20 transmits the UUID of the portable terminal 20 to the image forming device 10 (step 402), and the BLE control unit 14 of the image forming device 10 receives the UUID, as illustrated as step 301 of FIG. 9A. Next, as illustrated as step 304 of FIG. 9B, the BLE control unit 14 of the image forming device 10 transmits a registration completion notification, and the BLE control unit 24 of the portable terminal 20 receives the registration completion notification (Yes in step 403). Then, the job control unit 26 of the portable terminal 20 creates a scan job including the UUID of the portable terminal 20 added thereto (step 404). After that, the wireless control unit 25 transmits the scan job through wireless communication via the wireless router 30 (step 405), and the network control unit 15 of the image forming device 10 receives the scan job, as illustrated as step 305 of FIG. 9A.

Then, as illustrated as step 309 of FIG. 9A, the network control unit 15 of the image forming device 10 transmits scan data obtained by a scanning operation to the portable terminal 20, and the wireless control unit 25 of the portable terminal 20 receives the scan data (step 406). Then, the process ends.

In contrast, when a notification indicating that registration of the UUID is completed is not received (No in step 403), that is, when a registration rejection notification is transmitted, as illustrated as step 312 of FIG. 9A, or when a notification itself is not received, the job control unit 26 does not create a scan job (step 407), and the process ends.

Although a configuration in which a registration completion notification, a registration rejection notification, and a scan job rejection notification are transmitted by the BLE control unit 14 and received by the BLE control unit 24 has been explained above, these notifications may be transmitted by the network control unit 15 and received by the wireless control unit 25. Furthermore, the image forming device 10 may be configured not to transmit a registration permission notification or a registration rejection notification for a UUID. Furthermore, the image forming device 10 may be configured not to transmit a scan job rejection notification.

Furthermore, the portable terminal 20 may be configured to create a scan job, irrespective of whether or not a registration completion notification is received.

Furthermore, although a configuration in which the registered UUID is deleted after transmission of the scan data is completed in step 310 has been explained above, the UUID may be deleted after a certain time has passed since reception of the UUID. In this case, by causing the BLE control unit 24 to transmit the current time along with the UUID of the portable terminal 20 in step 402, the UUID may be deleted after a certain time has passed. Alternatively, the UUID may be deleted after a certain time has passed, based on the time at which the UUID was received in step 301, by using a time (not illustrated in the drawings) built in the image forming device 10.

As described above, the image processing system 1 according to the second exemplary in configured to exclusively use the image forming device 10 and perform a reading instruction by causing the image forming device 10 and the portable terminal 20 to share a UUID. Therefore, during the period in which a UUID is registered in the image forming device 10, registration of a UUID and a scan job from a different portable terminal 20 are rejected, and PullScan from a portable terminal 20 other than the portable terminal 20 having the registered UUID may thus be prevented.

Furthermore, in the first exemplary embodiment and the second exemplary embodiment, a case where BLE is used for short-range wireless communication is described. However, the short-range wireless communication is not limited to the above. As long as the image forming device 10 and the portable terminal 20 directly perform short-range wireless communication, the short-range wireless communication may be implemented by communication of a one-time password or a UUID through NFC, Felica™, or the like.

Furthermore, although an operation for performing PullScan is explained in the first exemplary embodiment and the second exemplary embodiment, the above explanation may also be applied to the case where various operations including printing and copying as well as PullScan are performed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiment were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing system comprising:
a portable terminal; and
an image forming device configured to receive a reading instruction for an image from the portable terminal and transmit data based on the reading instruction to the portable terminal and an exclusive time period,
wherein on a condition that the portable terminal was located or is located within a range available for short-range wireless communication of the image forming device and identification information of a different portable terminal is not currently registered in the image forming device, the image forming device and the portable terminal are configured to share temporary information which is able to exclusively possess a reading instruction for an image from the portable terminal to the image forming device for the exclusive time period, and the portable terminal is configured to transmit the reading instruction for an image to the image forming device configured to share the temporary information which is able to exclusively possess the reading instruction for the exclusive time period,
wherein the exclusive time period extends from a time when the temporary information is shared until a time when the temporary information is invalidated, the temporary information being invalidated in response to determining that a first one, among the transmission of the data based on the reading instruction to the portable terminal and a predetermined time passing since the time when the temporary information is shared, has occurred, and
wherein during the exclusive time period, the identification information of the different portable terminal is prevented from being registered in the image forming device.

2. The image processing system according to claim 1, wherein the temporary information that is able to exclusively possess the reading instruction for an image for the exclusive time period is temporary authentication information transmitted by the image forming device.

3. The image processing system according to claim 1, wherein the temporary information that is able to exclusively possess the reading instruction for an image for the exclusive time period is identification information for identifying the portable terminal.

4. An image forming device comprising:
at least one processor which implements:
an information reception unit configured to receive identification information for identifying a portable terminal, through short-range wireless communication;

a registration unit configured to temporarily register the received identification information for an exclusive time period when different identification information is not currently registered;

an instruction reception unit configured to receive a reading instruction including the identification information for identifying a portable terminal;

a reading execution unit configured to execute reading when the temporarily registered identification information is the same as the identification information included in the reading instruction and the exclusive time period has not expired; and a data transmission unit configured to transmit read data obtained by execution of the reading by the reading execution unit to the portable terminal that is identified by the same identification information, wherein the exclusive time period extends from a time when the identification information is received until a time when the temporarily registered identification information is deleted, the temporarily registered identification information being deleted in response to determining that a first one, among the transmission of the read data and a predetermined time passing since the time when the identification information is received, has occurred, and wherein during the exclusive time period, the different identification information is prevented from being registered.

5. The image forming device according to claim 4, wherein the reading execution unit is further configured to not execute the reading when the temporarily registered identification information is not the same as the identification information included in the reading instruction or when no identification information is included in the reading instruction.

6. The image forming device according to claim 4, wherein the at least one processor further implements a notification unit configured to notify the portable terminal of a registration status of the identification information, in response to reception of the identification information for identifying the portable terminal through short-range wireless communication.

7. An image forming device comprising:
at least one processor which implements:
a transmission unit configured to transmit temporary authentication information to a portable terminal that is located within a range available for short-range wireless communication when identification information of a different portable terminal is not currently registered in the image forming device;

an instruction reception unit configured to receive a reading instruction including the temporary authentication information from the portable terminal;

a reading execution unit configured to execute reading when the transmitted temporary authentication information is the same as the temporary authentication information included in the reading instruction and an exclusive time period has not expired; and a data transmission unit configured to transmit read data obtained by execution of the reading to the portable terminal, wherein the exclusive time period extends from a time when the reading instruction including the temporary authentication information is received until a time when the temporary authentication information is invalidated, the temporary authentication information being invalidated in response to determining that a first one, among the transmission of the read data and a predetermined time passing since a time when the temporary authentication information is generated, has occurred, and wherein during the exclusive time period, the identification information of the different portable terminal is prevented from being registered in the image forming device.

8. The image forming device according to claim 7, wherein the reading execution unit is further configured to not execute the reading when the transmitted temporary authentication information is not the same as the temporary authentication information included in the reading instruction or when the temporary authentication information is not included in the reading instruction.

9. An image forming method comprising:
receiving identification information for identifying a portable terminal, through short-range wireless communication;

temporarily registering the received identification information for an exclusive time period when different identification information is not currently registered;

receiving a reading instruction including the identification information for identifying a portable terminal;

executing reading when the temporarily registered identification information is the same as the identification information included in the reading instruction and the exclusive time period has not expired; and transmitting read data obtained by execution of the reading to the portable terminal that is identified by the same identification information, wherein the exclusive time period extends from a time when the identification information is received until a time when the temporarily registered identification information is deleted, the temporarily registered identification information being deleted in response to determining that a first one, among the transmission of the read data and a predetermined time passing since the time when the identification information is received, has occurred, and wherein during the exclusive time period, the different identification information is prevented from being registered.

10. An image forming method comprising:
transmitting temporary authentication information to a portable terminal that is located within a range available for short-range wireless communication when identification information of a different portable terminal is not currently registered;

receiving a reading instruction including the temporary authentication information from the portable terminal;

executing reading when the transmitted temporary authentication information is the same as the temporary authentication information included in the reading instruction and an exclusive time period has not expired; and transmitting read data obtained by the execution of the reading to the portable terminal, wherein the exclusive time period extends from a time when the reading instruction including the temporary authentication information is received until a time when the temporary authentication information is invalidated, the temporary authentication information being invalidated in response to determining that a first one, among the transmitting of the read data and a predetermined time passing since a time when the temporary authentication information is generated, has occurred, and wherein during the exclusive time period, the identification information of the different portable terminal is prevented from being registered in the image forming device.

* * * * *